United States Patent [19]

Morgan, Jr.

[11] Patent Number: 5,074,252

[45] Date of Patent: Dec. 24, 1991

[54] RECHARGEABLE INSECTICIDE DISPENSER PROVIDING CONTROLLED RELEASE OF AN INSECTICIDE COMPOSITION

[76] Inventor: Charles Morgan, Jr., 12150 Pate Rd., Rockvale, Tenn. 37153

[21] Appl. No.: 553,171

[22] Filed: Jul. 16, 1990

Related U.S. Application Data

[63] Continuation-in-part of Ser. No. 173,278, Mar. 25, 1988, abandoned.

[51] Int. Cl.$^5$ ............................................. A01K 13/00
[52] U.S. Cl. ................................................... 119/156
[58] Field of Search ................ 119/106, 156; 514/876; 424/411

[56] References Cited

U.S. PATENT DOCUMENTS

| | | | |
|---|---|---|---|
| 1,081,148 | 12/1913 | Quayle | 119/106 X |
| 1,127,249 | 2/1915 | Hughes | 119/106 |
| 4,338,886 | 7/1982 | McBride | 119/106 |
| 4,425,874 | 1/1984 | Child | 119/156 |
| 4,574,742 | 3/1986 | Morgan Jr. | 119/156 |

Primary Examiner—Robert P. Swiatek
Attorney, Agent, or Firm—Abe Hatcher

[57] ABSTRACT

An insecticide dispenser made up of one flexible compartment or a series of flexible compartments forming or making up a cow ear tag, a browband, or a collar and filled with saturated fabric, an outeredge of packing material extending to one or more dispensing orifices. When the dispenser has more than one compartment, there is a restricted flow control channel in a wall dividing each compartment from an adjoining compartment. One compartment may be a primary compartment and one or more others in a series of sequence on one or both sides of the primary compartment or extending downward from both ends of the primary compartment. Insecticide is dispensed to cows, horses and domestic animals when the animals turn their heads or shake their heads so that the insecticide in the packing material touches their hairy, furry or like coating. The insecticide dispensed is replaced by more insecticide flowing into the packing material which fills the one or more dispensing orifice. A new safe and longer lasting insecticide formulation having as a primary ingredient, a pyrethrin, permethrin, or organophosphate insecticide and containing piperonyl butoxide as an synergistic enhancer is disclosed.

11 Claims, 4 Drawing Sheets

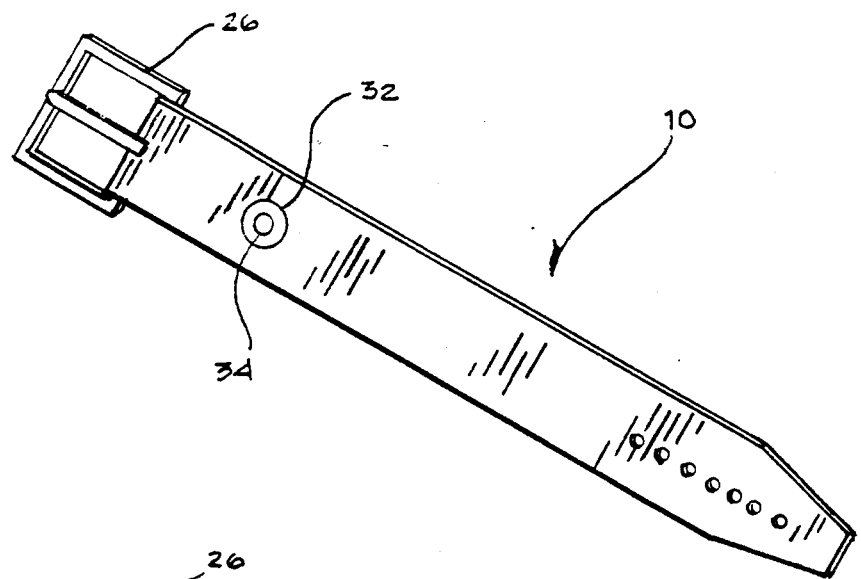
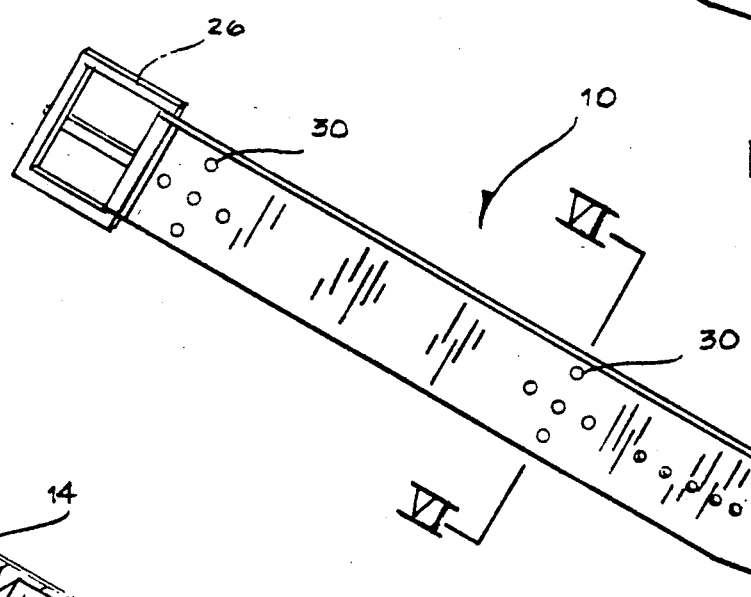
FIG. 3
FIG. 4
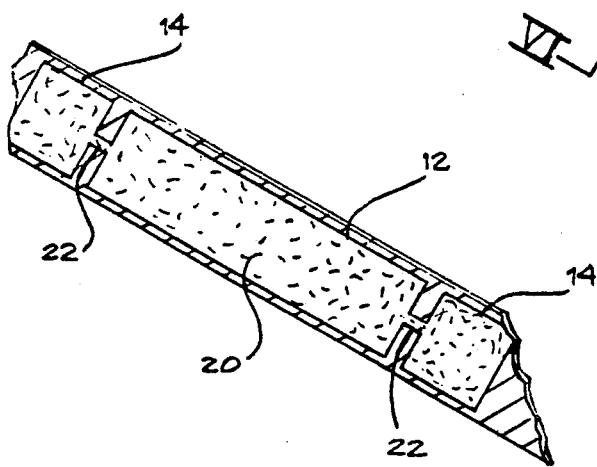
FIG. 5
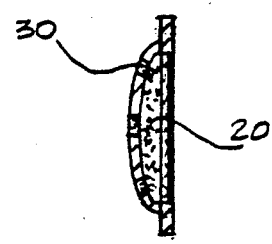
FIG. 6

RECHARGEABLE INSECTICIDE DISPENSER PROVIDING CONTROLLED RELEASE OF AN INSECTICIDE COMPOSITION

This is a continuation-in-part of Ser. No. 173,278, filed Mar. 25, 1988, and now abandoned.

BACKGROUND OF THE INVENTION

1. Field of Invention

This invention relates to a dispenser for a novel insecticide composition and how to dispense it. More particularly, it relates to a device and way for releasing the composition to the hair, fur, and skin of livestock and domestic animals.

2. Description of the Prior Art

There are two primary problems involved in the field of dispensing insecticide onto livestock and domestic animals, one finding a composition that is not too potent, strong or dangerous to satisfy government environmental and other requirements and the other, coming up with a way to dispense such composition so that it lasts until the end of the fly season or for at least six months and does not become sublethal. McBride U.S. Pat. No. 4,338,886 involves use of a livestock collar having two separate pouches of liquid toxicants sodium fluoracetate, apparently undiluted, to kill attacking coyotes when the pouches are punctured by the coyote's teeth. Hoskings British Patent 709,159 concerns killing lice on birds by discharging vapor from a solid insecticide such as a mixture of nicotine and napathalene or para-di-chlor-benzene and nicotine sulphate through an opening in a casing closed by a rupturable diaphragm before use. Hair U.S. Pat. No. 4,506,630, Goodwin U.S. Pat. Nos. 3,935,839 and 4,023,532 and Hack et al European Patent Office Patent Publication 0 140 558 have to do with using wicks for controlling dispensing of insecticide, such as Goodwin's mixture of insecticide and oil or diesel fuel or Hack's undiluted carbonates and pyrethroids, to animals' faces. Steckel U.S. Pat. No. 4,428,327 describes a flat member impregnated with an insecticide composition comprising 10% permethrin {(3-phenoxyphenyl) methyl ( ) cis, trans-3 (2-dichloroethenyl)-2,2-dimethylsyclopropane carboxolate} and 90% unnamed inert ingredients. In my own U.S. Pat. Nos. 4,574,742 and 4,706,610 I have disclosed a livestock data indicator and clip on-type label or tag having a box like rigid compartment as a small part thereof containing an absorbent material treated with insecticide for attachment to the hairs of a horse's mane, cows' tail or the like. None of the foregoing art has solved the aforementioned twofold problem of formulating an environmentally acceptable insecticide composition and finding a way to dispense it such that it will last for more than a couple of months before requiring refilling or becoming sublethal.

SUMMARY OF THE INVENTION

After extensive investigation and experimentation I have come up with a properly formulated insecticide composition that may be dispensed in a critically controlled manner by filling a dispenser made up substantially wholly of one or more plastic, leather, rubber or the like flexible compartments with a mass of fabric packing material such as polypropylene, polyethylene, polyester and a fabric material available on the market known as fabray capable of becoming saturated with the insecticide, holding it, and releasing it at intervals, said packing material extending all the way to a wall or walls of the one or more compartments, and to and through at least one dispensing orifice in the sole compartment or a succeeding compartment of a series or sequence of compartments to a plane flush with an external surface. Insecticide is dispensed to the bodies of cows, horses and domestic animals when they turn there heads or shake their heads so that insecticide in the packing material filling the dispensing orifice is released upon the packing material in the dispensing orifice touching their hairy, furry or like coating. This causes the dispensed insecticide to be replaced by more insecticide flowing into the packing material which fills the dispensing orifice. My invention requires a control restricted opening between primary and secondary compartments with a continuous mass of packing material leading therethrough. I have found that I can make a dispensing chamber comprising one or more compartments out of a whole collar, browband, ear tag or the like. Putting it another way, I use a whole article for the one or more compartments or make one or more compartments into a whole article or dispensing device. According to one embodiment of my invention I employ a primary compartment and at least one secondary compartment, preferably of lesser volume than the primary. According to another embodiment I make a ear tag hollow inside as a sole or single compartment. As such the compartment has a constricted portion opposite of the end which attaches to the ear. My insecticide dispensing device or dispenser comprising substantially as a whole one or more compartments there may be a browband for horses. In this instance I employ a flexible primary compartment with a secondary compartment, at each end thereof, with each secondary compartment having the dispensing orifice therein. The at least one compartment according to the invention may also make up a dog or cat collar with the at least one compartment being a primary compartment having secondary compartments extending vertically or perpendicularly from each end thereof.

The packing material filling the compartment or compartments is saturated with the insecticide composition by adding it through a hole which may be made by a syringe. When the dispenser comprises only one compartment, this same hole may serve as the dispensing orifice. The dispenser of the invention may be recharged with insecticide in the same or a similar manner.

BRIEF DESCRIPTION OF THE DRAWING

For a better understanding of my invention, reference will now be made to the drawing in which.

FIG. 3 is a semi-perspective view from one side of a collar-type dispenser according to the invention designed to apply insecticide to a domestic animal and having two secondary compartments, one on each side of a primary compartment.

FIG. 4 is a similar view of the other side of the dispenser shown in FIG. 3.

FIG. 5 is a broken away partial longitudinal cross section through the center and inside of the domestic animal insecticide applicator of FIGS. 3 and 4.

FIG. 6 is a transverse cross section of the domestic animal insecticide applicator of FIGS. 3 and 4 taken at VI-VI of FIG. 4.

DETAILED DESCRIPTION OF THE DRAWING AND OF CERTAIN EMBODIMENTS OF THE INVENTION

Figure 1:
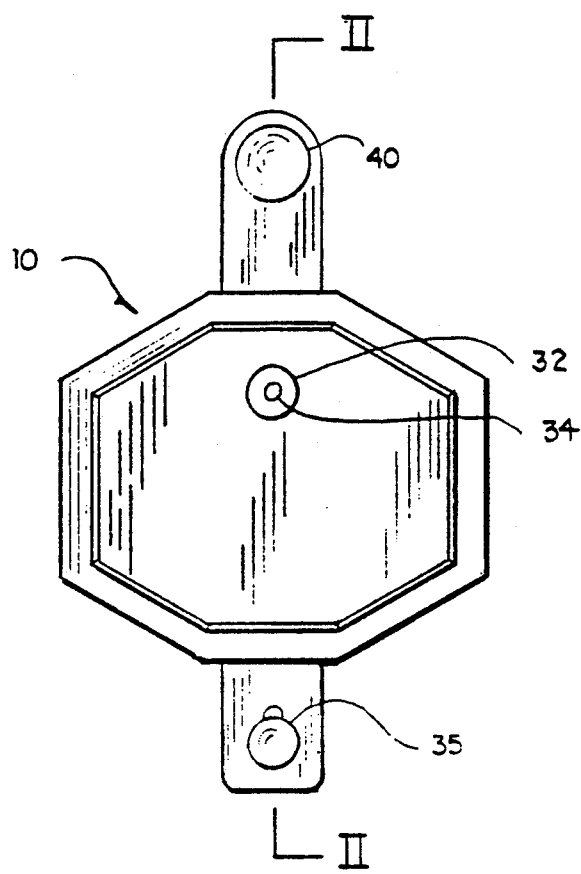
FIG. 1 depicts a view from one side of a dispenser according to the invention having one primary compartment and one secondary compartment of lesser volume and adapted for attachment to the ear of a cow.
Figure 2:
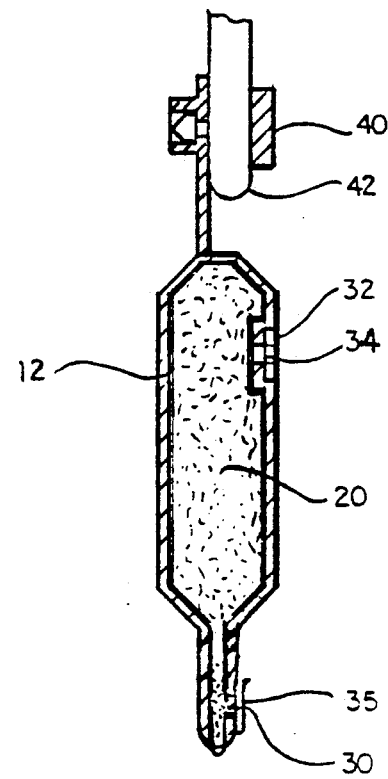
FIG. 2 is a cross section taken at II—II of FIG. 1.
Figure 7:
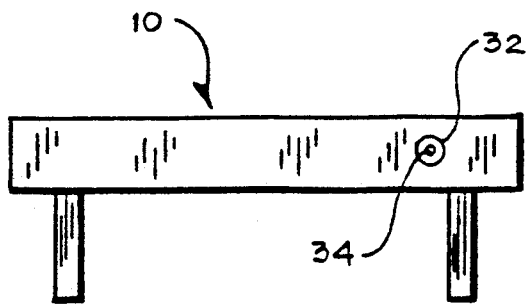
FIG. 7 is a view from one side of a browband insecticide dispenser adapted to fit on the brow of a horse and having a horizontal primary compartment with secondary compartments extending perpendicularly therefrom at each end thereof.
Figure 11:
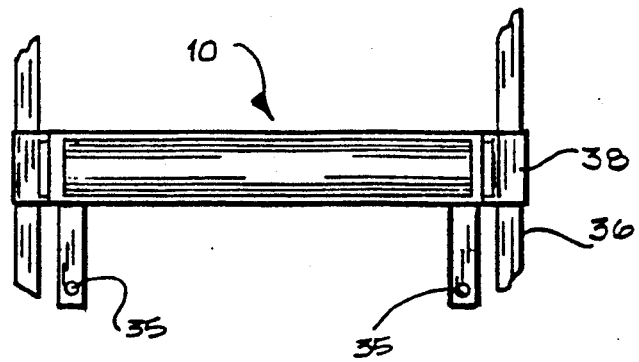
FIG. 11 is a prospective view from one side of the browband insecticide dispenser of FIG. 7.
Figure 12:
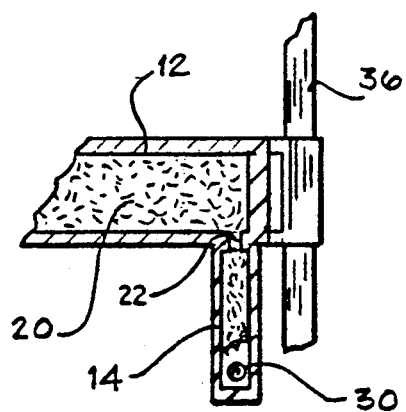
FIG. 12 is a slightly enlarged view of the browband insecticide dispenser of FIG. 7 broken away at one end thereof to show in section a portion of the continuous mass of fabric packing material extending from the primary compartment perpendicularly or vertically through a restricted control opening into one of the two secondary compartments and on into a dispensing orifice to a plane flush with an external surface of a wall of the one of the two secondary compartments.

The dispenser of the invention 10 is made up of a single primary-single smaller secondary compartment configuration 12 as depicted in FIGS. 1 and 2, or of a plurality or series or sequence of compartments 12, 14 as depicted in FIGS. 3-7, inclusive, and 11 and 12. The single primary-single smaller secondary compartment configuration 12, or compartments 12, 14 have at least one dispensing orifice 30 into which a continuous mass of fabric packing material 20 saturated with insecticide extends as far as an outer end thereof. A tape 35 may be placed over dispensing orifice 30 to prevent escape of insecticide between manufacture and the time the insecticide dispenser 10 is applied to the cow, horse, or other farm or domestic animal. Where there are two or more compartments 12, 14, this material extends through a channel 22 in a wall therebetween. The collar illustrated in FIGS. 3 and 4 has a buckle 26 for attaching around the neck of a cat or dog, for example, whereas the browband of FIG. 7 may have a strap 36 which runs through loops 38 and fastens it to a bridle, for example. On the other hand, the tag-type dispenser such as shown in FIGS. 1 and 2, and 8 and 9, may be attached to a cow's ear by a rivet 40 running through an ear lobe 42 as shown in FIGS. 1 and 2. The same dispenser of FIGS. 1 and 2 may have a cap or stopper 32 with a vent 34 for closing and opening through which packing material filling the dispenser 10 was saturated with insecticide as shown in FIG. 10.

Figure 8:
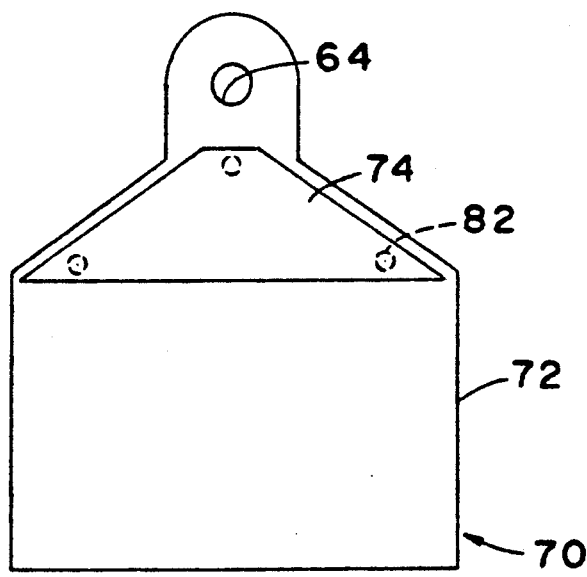
FIG. 8 and 9 are respective front and rear views of single compartment dispensers.
Figure 9:
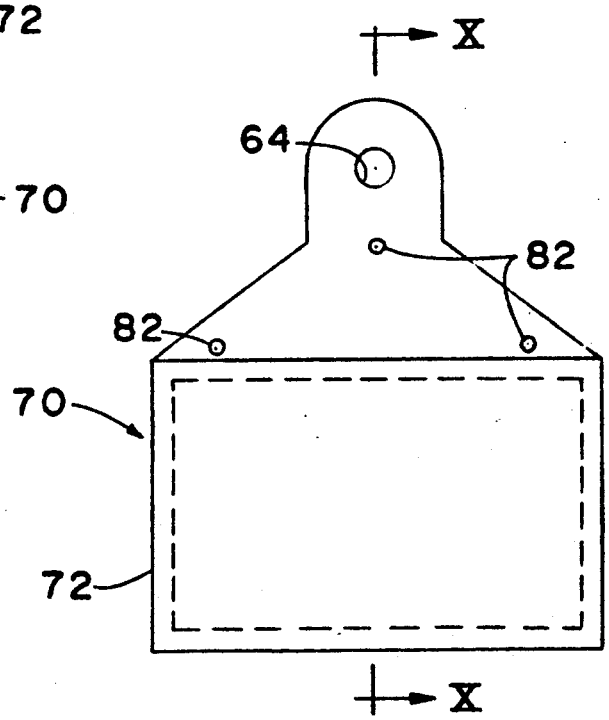
Figure 10:
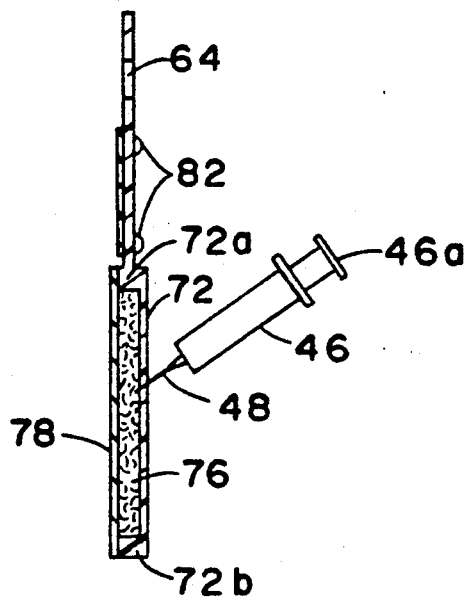
FIG. 10 is a sectional view of the embodiment of FIGS. 8 and 9 showing in addition how a hypodermic needle may be used to make a hole in the compartment for adding the insecticide to the mass of packing material, a hole which may later be used as an orifice or required for dispensing insecticide from the packing.

FIGS. 8 to 10 who a single-compartment dispenser 70 comprised of a relatively flat plastic case 72 provided with an upper snap-on label 74 and an upper extension having a hole 64 therein. Case 72 is molded with an open interior to house an absorbent packing material 76. After the material is inserted into the interior of case 72, a cover 78 is located over the material and sealed to upper and lower wall portions 72a and b of the case. Cover 78 can be sealed to the edges of 72a and b by any suitable means, for example by melting the material 72 and 78 after 78 is placed against the edges of 72a and b. As seen in FIG. 10, a syringe 46 having a plunger 46a and a needle 48 is used to make a hole (unnumbered) and fill it with packing material 76, the hole later being used to dispense insecticide from pacing material 76, which fills it to its outer edge, label 74 is provided with knobs 82 that snap into and/or around corresponding parts.

The new insecticide composition which I have formulated after extensive research and found can be safely and effectively dispensed in a dispenser according to my invention without adversely affecting the environment or becoming sublethal is made up in percent by weight 5-30% insecticide selected from the group consisting of pyrethrin, permethrin and organophosphate such as diazinon, 15-50% piperonyl butoxide, 25-50% petroleum distillate and 10-40% inert carrier (which may be oil or water-based).

Following are specific examples showing narrower ranges of components for use of the specific or particular insecticide used.

| Pyrethrin | 5-12% |
|---|---|
| Piperonyl Butoxide | 38-42% |
| Petroleum Distillate | 30-34% |
| Inert Carrier | 18-22% |
| Permethrin (including less than 1% related reaction products) | 8-12% |
| Piperonyl Butoxide | 38-42% |
| Petroleum Distillate | 30-34% |
| Inert Carrier | 18-22% |
| Diazinon (o, o, diethyl o,(2 isopropy-6-methyl-4-pyrimidinyl phosphorothioate) | 18-22% |
| Piperonyl Butoxide | 18-22% |
| Petroleum Distillate | 40-45% |
| Inert Carrier | 10-15% |

The following specific compositions have proved highly effective in the insecticide dispenser of the invention in controlling hornflies and like insect pests on cattle for long periods without becoming sublethal.

| Pyrethrin | 8% |
|---|---|
| Piperonyl Butoxide | 40% |
| Petroleum Distillate | 32% |
| Inert Carrier | 20% |
| Permethrin | 10.87% |
| Piperonyl Butoxide | 40% |
| Petroleum Distillate | 31% |
| Inert Carrier | 19.13% |
| Diazinon | 20% |
| Piperonl Butoxide | 20% |
| Petroleum Distillate | 43% |
| Inert Carrier | 13% |

The following table reports data obtained in field test on cattle tagged with dispensers of the invention containing compositions of the invention.

| | Mean Number of Horn Flies per Side on Cattle Tagged with Dispenser Similar to that of FIGS. 1, 2, 8, 9, & 10 | | |
|---|---|---|---|
| Date | 20% Diazinon (Formulation Hereinabove) | 10% Permethrin (Formulation Hereinabove) | Control (No Insecticide) |
| 14 July | 109.2 | 136.5 | 233.5 |
| 21 July | 0.0 | 0.8 | 181.0 |
| 28 July | 2.3 | 0.7 | 244.4 |
| 4 Aug | 5.9 | 0.6 | 225.0 |

-continued

| | Mean Number of Horn Flies per Side on Cattle Tagged with Dispenser Similar to that of FIGS. 1, 2, 8, 9, & 10 | | |
|---|---|---|---|
| Date | 20% Diazinon (Formulation Hereinabove) | 10% Permethrin (Formulation Hereinabove) | Control (No Insecticide) |
| 11 Aug | 0.7 | 0.2 | 133.3 |
| 18 Aug | 7.6 | 0.2 | 229.5 |
| 25 Aug | 1.5 | 1.5 | 210.5 |
| 1 Sept | 9.6 | 1.9 | 149.3 |
| 8 Sept | 15.0 | 1.2 | 131.0 |
| 15 Sept | 1.0 | 1.9 | 205.0 |
| 22 Sept | 11.3 | 0.4 | 143.5 |
| 29 Sept | 6.6 | 4.0 | 91.8 |
| 6 Oct | 17.4 | 6.0 | — |

While the invention has been described in terms of preferred embodiments, the claims appended hereto are intended to encompass all embodiments which fall within the spirit of the invention.

Having thus described my invention and certain preferred embodiments thereof, I claim:

1. A rechargeable dispenser for releasing insecticide to livestock and domestic animals which comprises at least one flexible primary compartment and at least one flexible secondary compartment of lesser volume than said at least one flexible primary compartment said dispenser having at least one dispensing orifice in a wall of said at least one secondary compartment and said at least one primary compartment and said at least one secondary compartment being filled with a continuous mass of fabric packing material saturated with insecticide filling all the space inside said dispenser and extending through at least one restricted control opening between compartments and into and on inside said at least one dispensing orifice to a plane flush with an outer surface of said wall.

2. The dispenser of claim 1 wherein the insecticide is selected from the group consisting of pyrethrin, permethrin and organophosphate.

3. The dispenser of claim 1 wherein the insecticide is selected from the group consisting of pyrethrin, permethrin and diazion.

4. The dispenser of claim 1 comprising a cow tag.

5. The dispenser of claim 1 comprising a browband.

6. The dispenser of claim 1 comprising a collar.

7. The dispenser of claim 1 wherein said at least one flexible primary compartment is immediately above said at least one flexible secondary compartment of lesser volume and said dispenser is adapted to be attached to the ears of livestock.

8. The dispenser of claim 1 wherein said at least one flexible primary compartment and said at least one flexible secondary compartment comprise a single primary compartment between two secondary compartments one at each end thereof and said at least one dispensing orifice comprises a plurality of orifices at least one of which is in one of said two secondary compartments and at least one other of which is in the other of said two secondary compartments.

9. The dispenser of claim 1 wherein said at least one flexible primary compartment and said at least one secondary flexible compartment comprise a single primary compartment and two secondary compartments, one extending perpendicularly from said single primary compartment form a point near one end thereof and the other extending vertically form a point near the other end thereof, and said at lest one restricted control opening comprises two, one leading from the said single primary compartment to one of said two secondary compartments and the other of said two leading to the other of said secondary compartments.

10. A process for dispensing insecticide which comprises filling a dispenser comprising at least one flexible primary compartment and at least one flexible secondary compartment of lesser volume than said at least one flexible primary compartment with a continuous mass of fibrous packing material so that it extends continuously through at least one restricted control opening between said at least one flexible primary compartment and said at leas one flexible secondary compartment and on into and through at least one dispensing orifice in a wall of said at least one flexible secondary compartment to a plane flush with an outer surface of said wall, saturating said mass of fabric packing material inside said dispenser with insecticide, releasing insecticide from said mass in a controlled manner onto the body of an animal upon contact of a portion of said mass in said at least one orifice with said body and replenishing said insecticide in said portion of said continuous mass in said at least one orifice by insecticide automatically flowing from another portion of said mass inside said dispenser.

11. The process of claim 10 wherein said dispenser is refilled after it becomes exhausted.

* * * * *